(12) United States Patent
Johnson

(10) Patent No.: US 7,940,029 B2
(45) Date of Patent: May 10, 2011

(54) STATIC VAR CORRECTOR

(75) Inventor: Lynn Johnson, Verona, WI (US)

(73) Assignee: American Superconductor Corporation, Devens, MA (US)

( * ) Notice: Subject to any disclaimer, the term of this patent is extended or adjusted under 35 U.S.C. 154(b) by 443 days.

(21) Appl. No.: 12/166,357

(22) Filed: Jul. 2, 2008

(65) Prior Publication Data

US 2010/0001698 A1    Jan. 7, 2010

(51) Int. Cl.
*G05F 1/70*    (2006.01)

(52) U.S. Cl. ............................ 323/207; 323/205; 361/58

(58) Field of Classification Search .................. 323/205, 323/207–209, 211, 218, 293, 352, 356; 361/10, 361/20, 52, 56–58, 63, 65; 307/102–104, 307/125; 363/34, 37, 39, 41
See application file for complete search history.

(56) References Cited

U.S. PATENT DOCUMENTS

| | | |
|---|---|---|
| 3,217,171 A | 11/1965 | Corey |
| 3,968,422 A | 7/1976 | Waldmann |
| 3,987,360 A | 10/1976 | Brennen et al. |
| 4,001,670 A | 1/1977 | Gyugyi et al. |
| 4,013,937 A | 3/1977 | Pelly et al. |
| 4,068,159 A | 1/1978 | Gyugyi |
| 4,128,805 A | 12/1978 | Lanz |
| 4,328,551 A | 5/1982 | Yamaura et al. |
| 4,962,354 A | 10/1990 | Visser et al. |
| 5,134,356 A | 7/1992 | El-Sharkawi et al. |
| 5,138,247 A | 8/1992 | Tanoue et al. |
| 5,198,746 A | 3/1993 | Gyugyi et al. |
| 5,202,583 A | 4/1993 | Larsen et al. |
| 5,329,221 A | 7/1994 | Schauder |
| 5,329,222 A | 7/1994 | Gyugyi et al. |
| 5,343,139 A | 8/1994 | Gyugyi et al. |
| 5,351,181 A | 9/1994 | Brennen et al. |
| 5,355,076 A | 10/1994 | Chadwick |
| 5,374,853 A * | 12/1994 | Larsen et al. ................. 307/102 |
| 5,384,528 A | 1/1995 | Leowald et al. |
| 5,422,561 A | 6/1995 | Williams et al. |
| 5,424,627 A | 6/1995 | Clark et al. |
| 5,434,497 A * | 7/1995 | Larsen .......................... 323/209 |

(Continued)

FOREIGN PATENT DOCUMENTS

EP    0181575    5/1986

(Continued)

OTHER PUBLICATIONS

Hammad, "Comparing the Voltage Control Capabilities of Present and Future V Ar Compensating Techniques in Transmission Systems," IEEE Transactions on Power Delivery, vol. 11 (1996).

(Continued)

*Primary Examiner* — Rajnikant B Patel
(74) *Attorney, Agent, or Firm* — Occhiuti Rohlicek & Tsao LLP

(57) ABSTRACT

A system for providing reactive power compensation to a utility power network includes a switch coupled to the utility power network, and a capacitor coupled with the switch for providing a controlled amount of reactive current based on conditions of the utility power network. The system also includes a switchable power dissipation device coupled in series to the capacitor and configured to provide a preselected amount of impedance to the reactive current for a predetermined duration when a line voltage on the utility power network drops below a threshold.

27 Claims, 6 Drawing Sheets

U.S. PATENT DOCUMENTS

| | | | |
|---|---|---|---|
| 5,489,838 | A | 2/1996 | Leowald et al. |
| 5,514,915 | A | 5/1996 | Kim et al. |
| 5,519,312 | A | 5/1996 | Wang et al. |
| 5,526,252 | A | 6/1996 | Erdman |
| 5,541,498 | A | 7/1996 | Beckwith |
| 5,566,085 | A | 10/1996 | Marceau et al. |
| 5,610,501 | A | 3/1997 | Nelson et al. |
| 5,621,305 | A | 4/1997 | Clark et al. |
| 5,631,545 | A | 5/1997 | Norman et al. |
| 5,642,007 | A | 6/1997 | Gyugyi et al. |
| 5,644,218 | A | 7/1997 | Emmerich et al. |
| 5,670,864 | A | 9/1997 | Marz et al. |
| 5,694,308 | A | 12/1997 | Cave |
| 5,698,969 | A | 12/1997 | Gyugyi |
| 5,703,791 | A | 12/1997 | Amano et al. |
| 5,734,257 | A | 3/1998 | Schauder et al. |
| 5,804,949 | A * | 9/1998 | Othman et al. ............... 323/209 |
| 5,808,452 | A | 9/1998 | Gyugyi et al. |
| 5,814,975 | A | 9/1998 | Nelson et al. |
| 5,818,126 | A | 10/1998 | Mohan |
| 5,883,796 | A | 3/1999 | Cheng et al. |
| 5,939,798 | A | 8/1999 | Miller |
| 5,942,880 | A | 8/1999 | Akamatsu et al. |
| 5,952,816 | A | 9/1999 | Larsen |
| 5,969,509 | A | 10/1999 | Thorvaldsson |
| 6,107,785 | A | 8/2000 | Griffiths |
| 6,114,841 | A * | 9/2000 | Hasler et al. ................. 323/210 |
| 6,172,488 | B1 | 1/2001 | Mizutani et al. |
| 6,359,423 | B1 | 3/2002 | Noro |
| 6,560,128 | B1 * | 5/2003 | Rajda et al. ..................... 363/50 |
| 6,573,691 | B2 | 6/2003 | Ma et al. |
| 6,577,108 | B2 | 6/2003 | Hubert et al. |
| 6,674,267 | B2 * | 1/2004 | Wernersson ................. 323/210 |
| 6,900,619 | B2 | 5/2005 | Kehrli et al. |
| RE41,170 | E | 3/2010 | Hubert et al. |
| 2007/0030083 | A1 | 2/2007 | Hashimoto |

FOREIGN PATENT DOCUMENTS

| | | |
|---|---|---|
| GB | 2128423 | 4/1984 |
| JP | 58202509 | 11/1983 |
| JP | 59052809 | 3/1984 |
| JP | 59218710 | 12/1984 |
| JP | 01019929 | 1/1989 |
| JP | 05030686 | 2/1993 |
| JP | 05268727 | 10/1993 |
| WO | 8100648 | 3/1981 |
| WO | 96/19025 | 6/1996 |
| WO | 00/31925 | 11/2000 |

OTHER PUBLICATIONS

Rahim et al., Control of Subsynchronous Resonant Modes ina Series Compensated System Through Superconducting Magnetic Energy Storage Unites, IEEE Transactions on Energy Conversion, US, IEEE Inc., 11:175-180 (1996).

"Voltage and Discharge and Magnet and Superconductor", Nerac, Inc., 5-40 (1999).

Schauder et al., "Development of a 100MVAR Static Condenser for Voltage Control of Transmission Systems," IEEE Transactions on Power Delivery, 11:1486-1496 (1996).

Borgard, "Grid Voltage Support at your Fingertips," Transmission & Distribution World Magazine (1999).

"Academic Press Dictionary of Science and Technology," Academic Press, Inc. (1992).

Sasaki et al., "An Optimal Deployment of Fuel Cells in Distribution Systems by Using Genetic Algorithms" IEEE pp. 479-484 (1995).

Gyugyi, "Solid-State Synchronous Voltage Sources for Dynamic Compensation and Real-Time Control of AC Transmission Lines," IEEE Standard Press (1993).

Swain et al., "On Review Power Compensation," IEEE, 0/7803-2559-1/95 (1995).

"Second Generation of High Power Active Harmonic Conditioner based on the Current Injection Principle," MGE UPS Systems (1998).

\* cited by examiner

STATIC VAR CORRECTOR

BACKGROUND

This application relates to static VAR correctors (SVCs).

Static VAR correctors, also referred to as static VAR compensators, are electrical devices that provide reactance compensation to power transmission networks. SVCs are commonly used in various applications, including for example, regulating utility line voltage, improving network steady-state stability, and establishing near unity power factor on transmission lines.

Typically, an SVC includes a bank of controllable capacitors that can be individually switched in and out of circuit by a set of semiconducting switches (e.g., thyristors). Each switch is driven by electrical gating signals generated based on line conditions, allowing the corresponding capacitors to discharge and conduct in a controlled manner. When using thyristor switches that are capable of responding to gating signals within a sub-cycle (e.g., on the order of several milliseconds), an SVC is able to provide near-instantaneous reactance flow to compensate voltage/current fluctuations on utility networks.

The source impedance of a power system is usually inductive due to the presence of transformers and long transmission lines. Thus, when capacitors are switched onto transmission lines of the system, undesirable resonant conditions can be generated. Large amounts of resonant current may undesirably cause overheating in circuit components (e.g., capacitors) as well as current distortions in utility lines. Therefore, in some SVCs, a detuning reactor/inductor is provided to prevent capacitors from resonating with line inductance under normal operating conditions (e.g., line voltage within 95%~105% of rated level). This reactor-capacitor coupling, however, does not prevent resonance from occurring under low voltage conditions, for example, when reactive power from SVCs are desired for rebuilding utility line voltage after a temporary power outage or voltage dip.

SUMMARY

In one general aspect of the invention, a system for providing reactive power compensation to a utility power network is provided. The system includes a switch coupled to the utility power network, and a capacitor coupled with the switch for providing a controlled amount of reactive current based on conditions of the utility power network. The system also includes a switchable power dissipation device coupled in series to the capacitor and configured to provide a preselected amount of impedance to the reactive current for a predetermined duration when a line voltage on the utility power network drops below a threshold.

Embodiments of this aspect of the invention may include one or more of the following features.

A controller is coupled to the utility power network and configured to control the switch based on line conditions of the utility power network. The controller may also detect the line voltage on the utility power network. When the line voltage is in a range between 95% and 105% of a desired nominal voltage, the controller controls the switch to operate in a first mode; when the line voltage is below the threshold, the controller controls the switch to operate in a second mode.

The switch may include a diode connected in reverse-parallel with a thyristor that is switchable by a gate signal. Alternatively, the switch may include a first and second thyristors connected in reverse-parallel, each of which is switchable by a gate signal. An inductive reactor may be coupled with the capacitor and configured for reducing resonances generated by operating the switch in the first mode.

The power dissipation device may include a resistive element coupled in parallel with a second switch. When the line voltage is below the threshold, the second switch is open for the predetermined duration to allow current passage through the resistive element. At the end of the predetermined duration, the second switch is closed to bypass the resistive element.

In another general aspect of the invention, a method is provided for controlling a reactive power compensation device connected to a utility power network. The method includes detecting a low voltage condition on the utility power network; discharging a capacitive element in the reactive power compensation device, in response to the low voltage condition, to the utility power network for a first duration; and connecting a device to the utility power network to dampen resonances generated by the discharging of the capacitive element.

Embodiments of this aspect of the invention may include one or more of the following features.

The capacitive element may be coupled in series with a switch. In response to the low voltage condition, the switch is closed for the first duration to allow the capacitive element to provide reactive power to the utility power network.

A switchable power dissipation device may be connected to the utility power network for a predetermined second duration to dampen resonances generated by the discharging of the capacitive element. The predetermined second duration may be shorter than the first duration. The switchable power dissipation device may include a resistive element coupled in parallel with a second switch. The second switch is open during the predetermined second duration so that the capacitive element discharges through the resistive element to the utility power network.

The low voltage condition may be determined by detecting a line voltage on the utility power network and comparing the line voltage with a predetermined low voltage threshold, or alternatively, by detecting a line current on the utility power network and comparing the line current with a predetermined current threshold.

In another general aspect of the invention, a method for providing reactive power compensation to a utility power network is provided. The method includes providing a varying number of capacitors to supply a controlled amount of reactive current to the utility power network under a first line condition; and connecting a power dissipation device for a predetermined duration to provide impedance to the reactive current under a second line condition.

Embodiments of this aspect of the invention may include one or more of the following features.

The first line condition may occur when line voltage is within a range between 95% and 105% of a desired nominal voltage. The second line condition may occur when line voltage falls below a preset low voltage threshold. To determine the first and second line conditions, an electric signal on the utility power network may be detected.

Each of the capacitors may be coupled with one of a plurality of switches. By controlling at least some of the plurality of switches, a selected number of capacitors may be connected to the utility power network.

The power dissipation device may include a resistive element coupled with a switch. The switch is open for the predetermined duration to allow capacitors to supply reactive current to the utility power network through the resistive element.

Among other advantages and features, a power compensation system capable of providing controllable amounts of reactance to utility networks is provided. When line voltage appears within a normal range, the system operates in a steady-state mode, supplying reactive power to regulate line voltage, correct power factor, and/or improve other steady-state line performance. In the event of a voltage drop, by quickly switching into a transient mode that provides a continuous flow of reactance, the system is able to help rebuild utility line without causing large current surges or a significant presence of undesired harmonics.

Other features and advantages of the invention are apparent from the following description, and from the claims.

BRIEF DESCRIPTIONS OF DRAWINGS

DETAILED DESCRIPTIONS

System Overview

Figure 1:
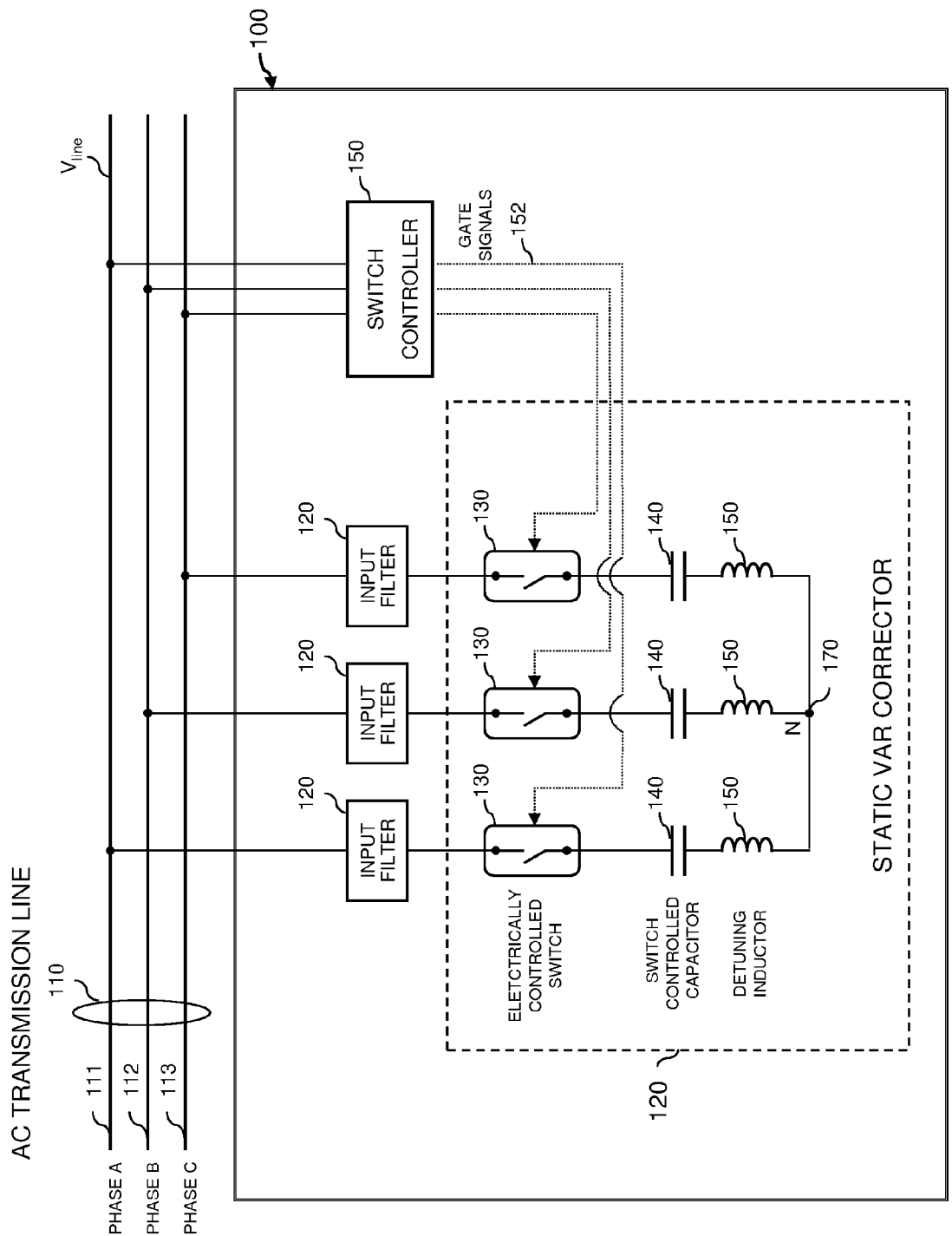
FIG. 1 shows a static VAR corrector for providing reactive power compensation to an AC transmission line.

Referring to FIG. 1, a power compensation system 100 is shown in connection with a three-phase alternating current (AC) transmission line 110 on a utility power network. Generally, AC transmission line 110 delivers electric signals in sinusoidal waves in each of three phases A, B, and C at a fixed frequency (e.g., 60 Hz), with a line voltage $V_{line}$ typically in an operating range of 4.1 kV to 34.5 kV.

Power compensation system 100 includes a static VAR corrector 120 and a switch controller 150. Very generally, SVC 120 is configured to provide power compensation to transmission line 110 in controlled amounts that are usually determined by switch controller 150 based on line conditions. Here, depending on specific applications, SVC 120 may provide controlled power flow for regulating utility line voltage, improving network stability, and/or correcting power factor on transmission line 110. For illustrative purposes, the following description is made primarily in the context of using SVC 120 to regulate line voltage in response to various steady-state conditions (e.g., when line voltage fluctuates within 95%~105% of rated level) and transient conditions (e.g., in the event of power outage or a sudden voltage dip).

In this example, SVC 120 includes a set of electrically controlled switches 130, switch controlled capacitors 140, and detuning inductors 120 that are coupled in a three-phase Y/star configuration between transmission line 110 and a neutral 170. Each capacitor 140 can be switched in circuit by a corresponding switch 130 to provide capacitive reactance (e.g., up to 250 MVAR) to line 110. Examples of electrically controlled switches include silicon-controlled rectifiers (SCRs) and Gate Turn-Off thyristors (GTOs) 130 that have ON (conducting) and OFF (non-conducting) states controllable by proper gate signals 152, as will be described in greater detail later. Each detuning inductor 120 has a preselected level of inductance that is configured to prevent capacitors from resonating with existing line inductance and generating large instantaneous current that may in turn cause overheating and current/voltage distortions.

Preferably, power compensation system 100 also includes a set of input filters 120 (e.g., low-pass filters) coupled between SVC 120 and transmission line 110 for removing high-frequency noises that may be caused for example, by actions of switches 130 and certain line faults.

Electrically Controlled Switch

Figure 2:
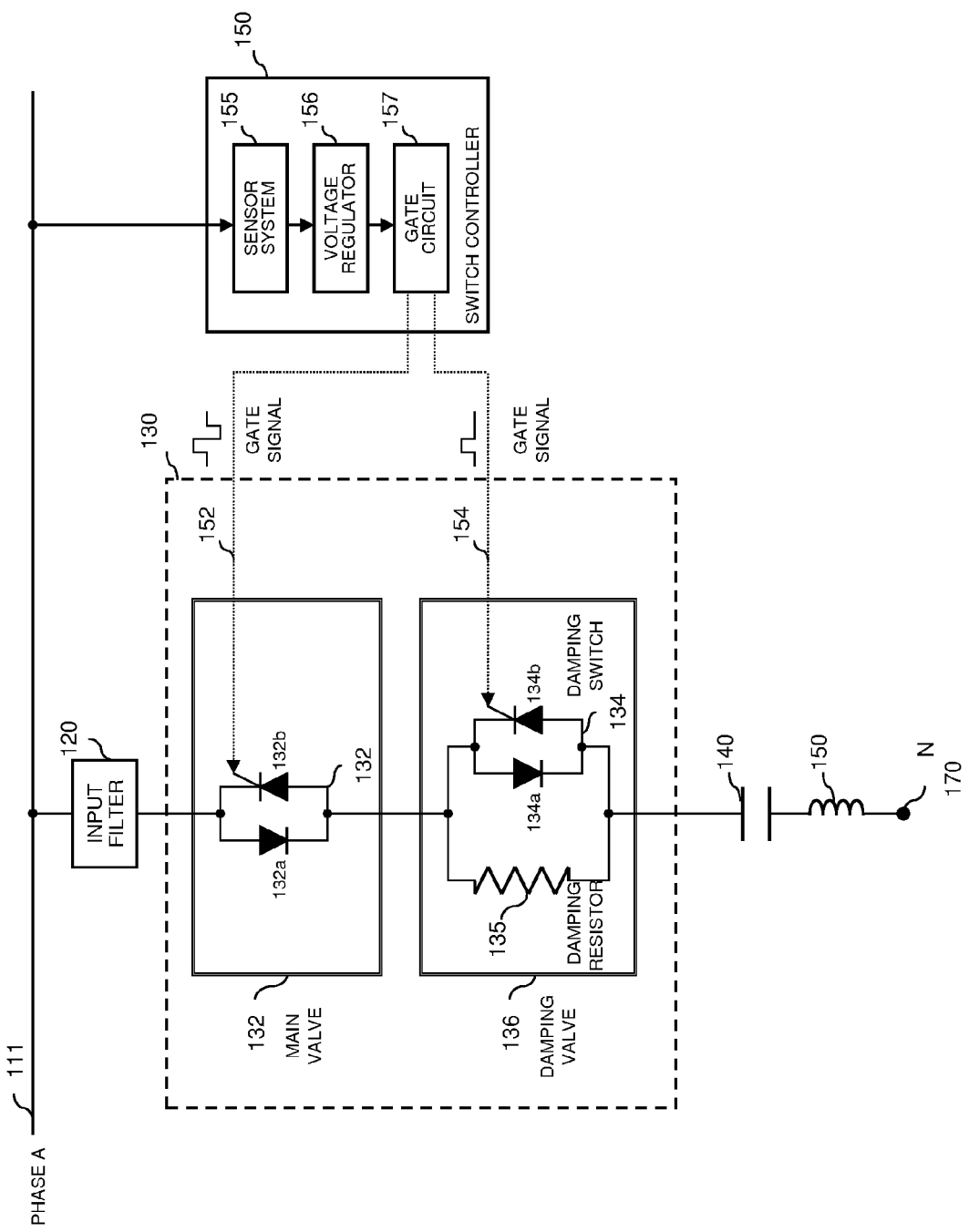
FIG. 2 shows an exemplary implementation of an SVC including a main valve and a damping valve.

Referring to FIG. 2, an exemplary implementation of electrically controlled switch 130 includes a main valve 132 and a damping valve 136 that are respectively controlled by gate signals 152 and 154 provided by switch controller 150. Note that for purposes of brevity, only one of the three phases of power compensation system 100 is shown in this figure.

Main valve 132 consists of a diode 132a connected in reverse-parallel with a thyristor 132b that can be switched on and off by gating signal 152. When main valve 132 is closed (i.e., thyristor 132b is gated ON), this diode-thyristor pair conducts bi-directional AC signals in alternative half-cycles. Typically, thyristor 132b can be triggered into conducting state by various gate signals, including for example, a current pulse or a DC current. Once triggered, current continues to flow through thyristor 132b until reaching a zero crossover, at which time conduction ceases for thyristor 132b to be activated again in the next electrical cycle. Preferably, gate signal 152 is delivered to the triggering electrode of thyristor 132b via means of fast communication to minimize time delay (e.g., over a fiber optic link or pulse transformers).

Damping valve 136 consists of a damping resistor 135 connected in parallel with a damping switch 134. Damping switch 134 includes for example, a pair of diode 134a and thyristor 134b in similar configuration as described in main valve 132. Here, the electrical state of damping switch 134 determines the role of resistor 135 in the circuit. For example, when thyristor 134b is in non-conducting state, damping switch 134 presents a near-infinite amount of impedance to incoming current. As a result, resistor 135 is effectively coupled in series with capacitor 140, presenting a preselected amount of impedance to the current through capacitor 140 to line 111 and dissipating real power. When thyristor 134b is turned on by gate signal 154, damping switch 134 forms a short circuit around resistor 135. In this case, capacitor current passes through damping switch 134 without experiencing the impedance of resistor 135.

Switch Controller

As described earlier, switch controller 150 generates gate signals that control the operations of both main valve 132 and damping valve 136, so that line voltage can be regulated by injecting/absorbing capacitive reactance into/from transmission line 110.

In this example, switch controller 150 includes 1) a sensor system 155 that uses one or multiple sensors to monitor line conditions and measure the line voltage to be controlled; 2) a voltage regulator 156 (e.g., a proportional integral regulator) that accepts as input a voltage error (i.e., the difference between a target voltage and measured operating voltage) and determines the amount of power needed to offset this voltage difference; and 3) a gate circuit 157 that generates appropriate gate signals 152 and 154 that control SVC 120 to deliver the desired amount of power flow.

Operations of switch controller 150 are described in the following section.

Modes of Operation

Power compensation system 100 is able to operate to regulate line voltage in a steady-state mode under normal conditions (e.g., when line voltage fluctuates within 95%~105% of rated level), and in a transient mode in response to line faults (e.g., in the event of voltage outage or a sudden voltage dip).

Under normal operating conditions (e.g., line voltage within 95%~105% of rated level), SVC 120 in conjunction with switch controller 150 function essentially as a steady-state regulating device, injecting/absorbing reactive power for regulating voltage near target level and improving other steady-state behaviors of utility networks. Main valve 132 is switched between ON and OFF to allow capacitors to provide reactance in controlled duty cycles, whereas damping valve 136 is gated continuously ON to short damping resistor 135 and to prevent significant power loss.

Upon the occurrence of a temporary power outage (or line sag), although line voltage has dropped substantially, the voltage across capacitor 140 may still appear at pre-sag level. Closing main valve 120 to allow capacitors 140 to discharge may thus inject a large instantaneous current into utility grid and generate higher order harmonics that can continue to oscillate in an under-damped circuit for many cycles. Since these transient effects may cause further instability on utility line and damage circuit components, conventional SVCs are often prevented from operating at a suppressed voltage.

Here, power compensation system 100 is capable of operating at reduced voltages in the transient mode as follows. Once a voltage drop occurs, damping resistor 136 is switched in series with capacitor 140 and inductor 150 for a pre-selected time window (e.g., one or two electric cycles). The presence of circuit resistance leads to rapid decay of undesired harmonics. At the end of the window, damping valve 136 is turned on to remove (short) damping resistor 136 from current path, which prevents further power loss.

Figure 3A:
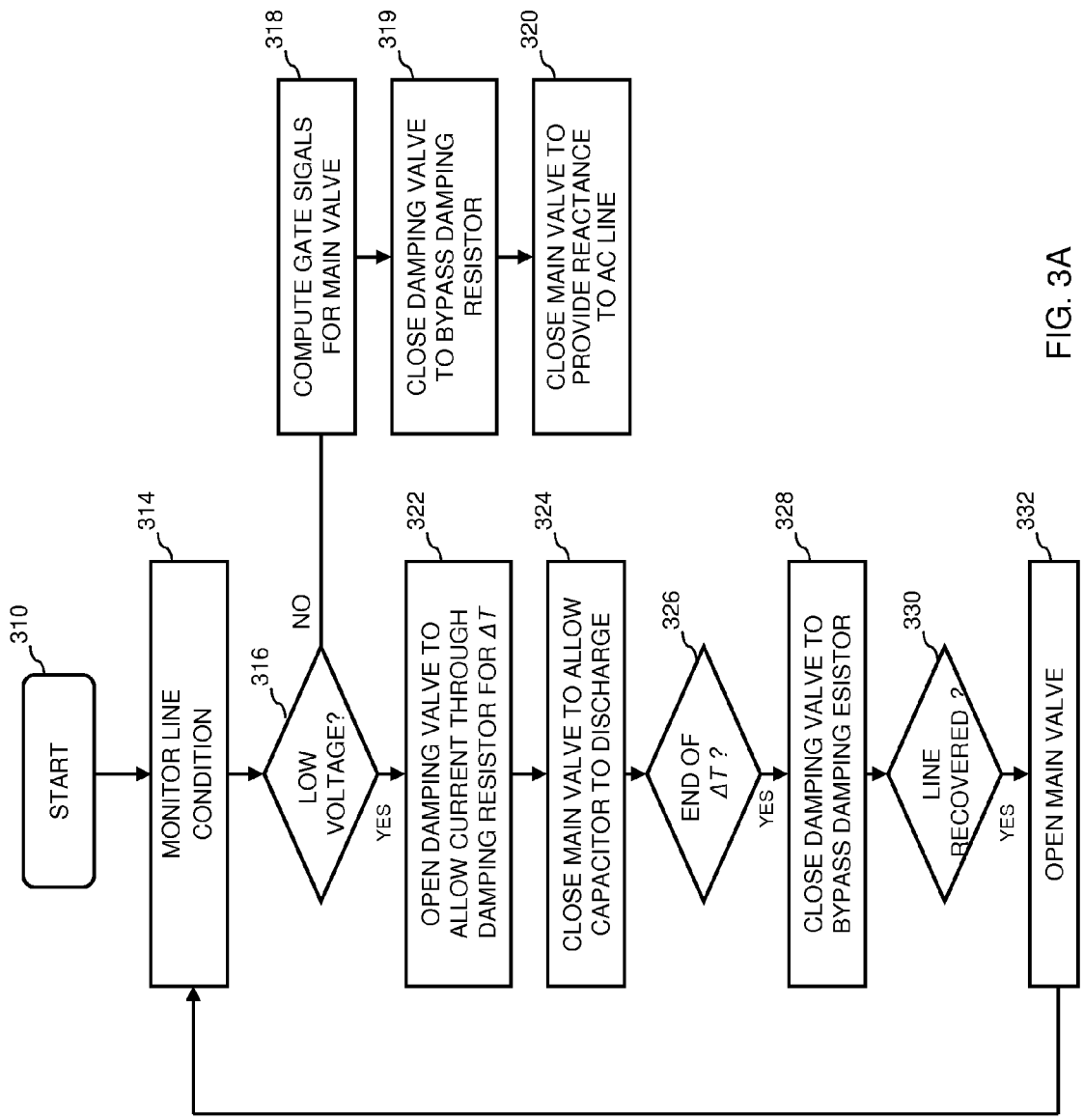
FIG. 3A is a flow diagram illustrating the operation of the SVC of FIG. 2 based on line conditions.
Figure 3B:
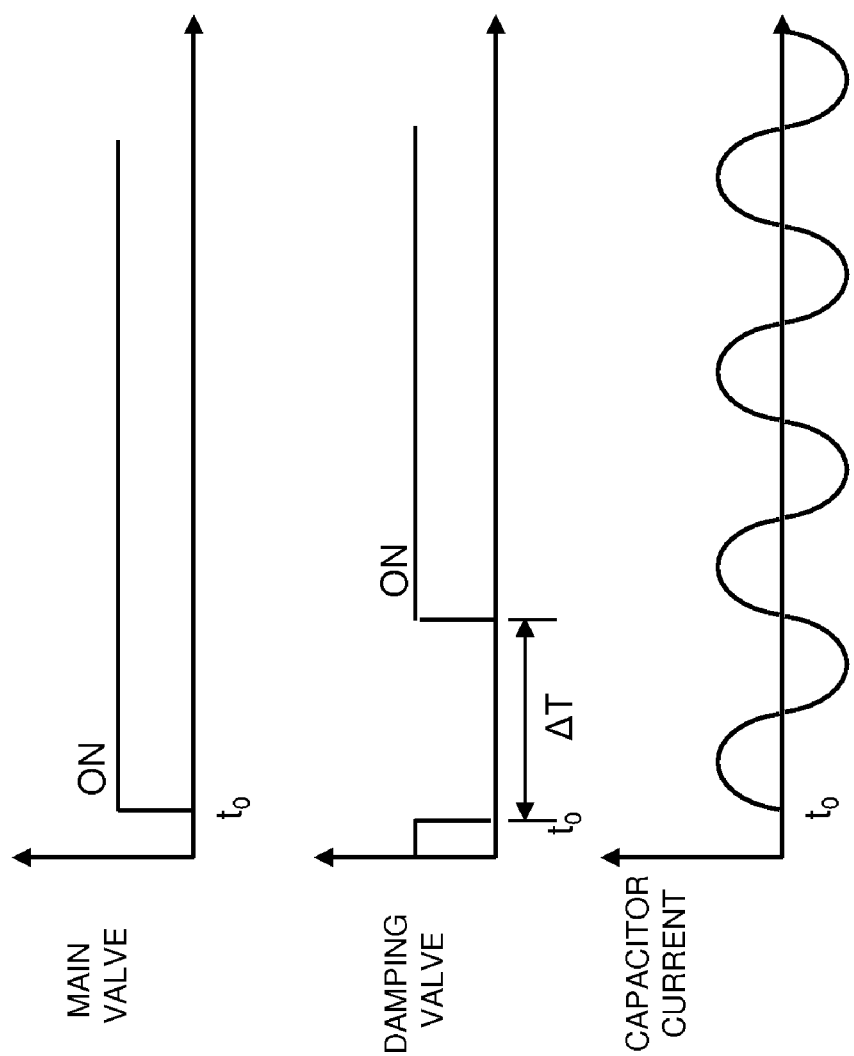
FIG. 3B shows a sequence of commands in operating the main valve and the damping valve of the SVC of FIG. 2.

Referring now to FIGS. 3A and 3B, a flow diagram 300 illustrates how switch controller 150 coordinates two modes of operation described above. Initially, switch controller 150 monitors line condition based on feedback signals from sensor system 155 to determine whether transmission line is operating under normal conditions, or a low voltage fault has occurred (step 314).

If the line voltage as measured is within a normal range (e.g., 95% to 105% of rated level), switch controller 150 generates gate signals to operate main valve 132 in a steady-state mode. In particular, by calculating the amount of reactance power required to regulate line voltage toward target, the number and duration of capacitors to be switched in are determined, and correspondingly, damping valve 136 is closed to bypass damping resistor 135, and main valve 132 is closed to connect capacitor(s) 140 to the utility line (steps 318, 319, and 320, respectively). Generally, thyristor 132b in the main valve is gated ON at the end of negative cycles when switch controller 150 detects the occurrence of a negative peak in line voltage, or alternatively, a zero cross-over in line current.

Line faults can be detected by switch controller 150 upon sensing voltage or current anomalies, for example, when a measured line voltage has fell below a preset threshold, or a measured line current has exceeded a preset instantaneous level. In some examples, switch controller 150 may also monitor a rate of change of line voltage and/or current as a means of detecting a sag event.

Once a voltage drop is detected, switch controller 150 quickly turns off damping valve 136 for a preselected period $\Delta T$ (step 322) and turns on main valve 132 (step 324), as illustrated in FIG. 3B. In response, capacitor 140 starts to discharge through damping resistor 135 and main valve 132, injecting reactance to the low voltage utility line. During $\Delta T$ (which typically lasts one or several electric cycles), the presence of resistance in the current path reduces current transients caused by the closing of main valve 132, thereby improving the quality of the reactance supplied to the utility networks. At the end of the period $\Delta T$, damping valve 136 is gated ON again to short the damping resistor (step 328), redirecting capacitive current to line through a conducting damping switch 134.

When operating in the transient mode, switch controller 150 continues to monitor line conditions through voltage/current sensors in sensor system 155. Upon receiving feedback signals that indicate a full recovery (e.g., line voltage back to 95% of rated level), switch controller 150 quickly opens one or more of the main valves 332 (step 332) and SVC 120 soon returns to steady-state operation.

Figures 4A, 4B:
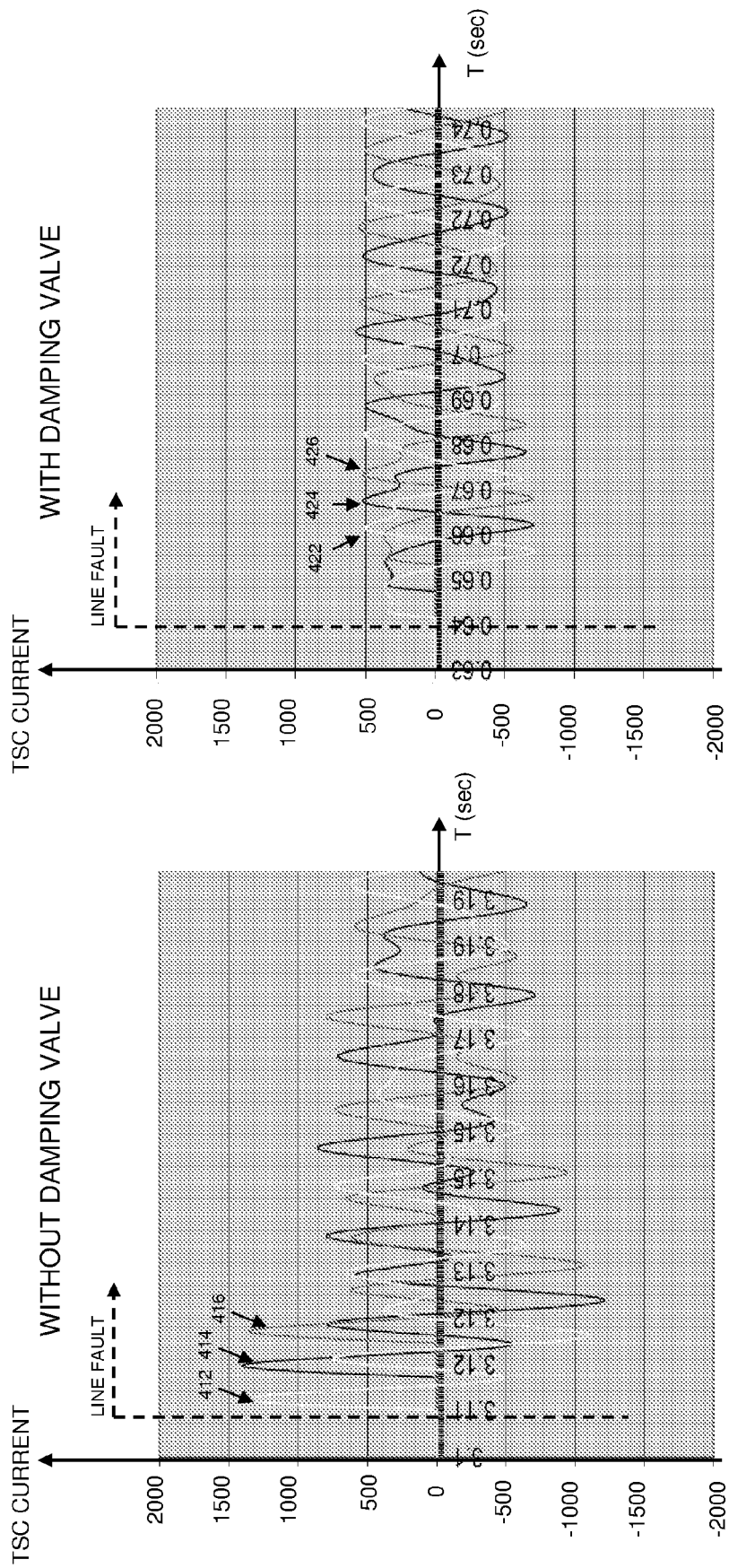
FIGS. 4A and 4B are simulation results illustrating current transients of a conventional SVC and an SVC with damping valve, respectively, after a low-voltage fault.

Referring now to FIGS. 4A and 4B, current transients as a result of a low-voltage line fault are simulated in SVCs with and without damping valve, respectively. FIG. 4A shows the three-phase current waveforms of a conventional SVC that has been detuned to $2.8^{th}$ harmonics in steady state. In the event of a significant voltage drop (e.g., 50%), the main valve is quickly closed in a step function to discharge capacitive power in order to help rebuild utility line. This operation induces a large current peak in the first electric cycle and a new 168 Hz ($2.8^{th}$ harmonic) resonance in each of the three phases of capacitor currents 412, 414 and 416. The integration of these harmonics with an intrinsic current component at 60 Hz (i.e., the typical operating frequency of AC current on transmission line) causes wave distortions that may continue to exist in an un-damped (or under-damped) circuit for an extended period of time and deteriorate transient performance both in SVC and along transmission line. Higher order harmonics may also induce premature shut-off of certain types of thyristors that can be damaging to circuit hardware.

In comparison, FIG. 4B shows the improvement of current transients by incorporating a controllable damping valve in the conventional SVC. Following the initial voltage dip, the damping valve is gated open for one electric cycle, during which time a damping resistor is coupled in circuit to provide resistance. As a result, the effect of higher order resonance on waveforms 422, 424, and 426 is much less prominent than 412, 414, and 416. As these harmonics decay rapidly due to damping, currents transients have settled by the end of the fourth cycle, giving rise to smooth stead-state waveforms.

Alternative Embodiments

It is to be understood that the configurations of power compensation system 100 shown in FIGS. 1 and 2 are intended to illustrate and not to limit the scope of the invention. There can be many design alternatives.

Figure 5:
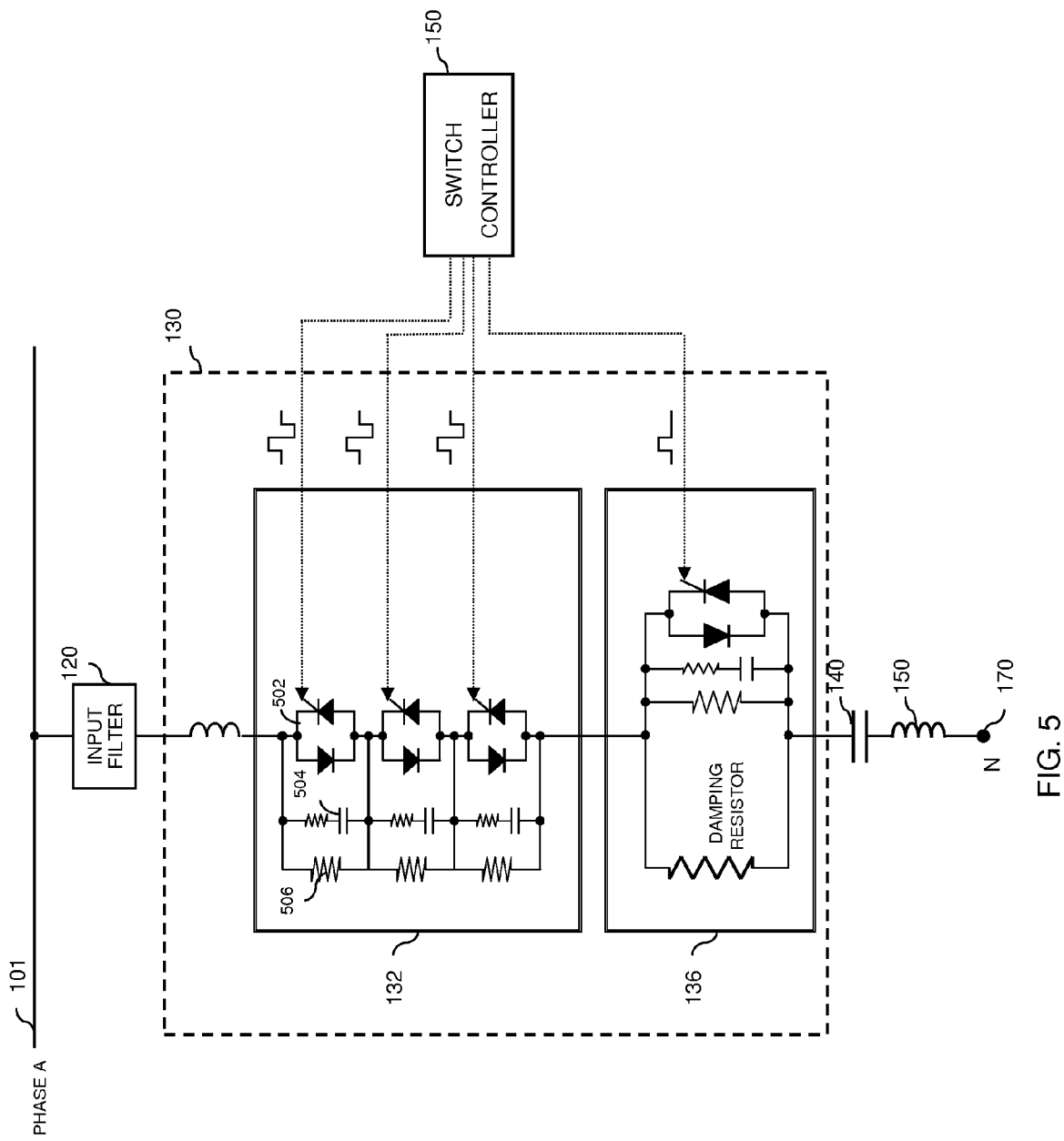
FIG. 5 shows an alternative implementation of an SVC.

For example, referring to FIG. 5, in an alternative implementation, main valve 132 includes a series of switch circuits each of which is controlled by gate signals from switch controller 150. One switch circuit may include a thyristor/diode switch 502, a traditional RC circuit 504 that absorbs switching energy and controls the rate of rise in voltage across switch 502, and additionally, a leakage resistor 506 that provides a leakage path to balance voltage across multiple thyristors. Damping valve 136 may also include a switch circuit in similar configurations.

In addition to the specific Y/star connection shown in FIG. 1, SVCs that are suitable for use with transmission lines may have three phases in Y/star connection with neutral either grounded or ungrounded, or alternatively, three phases in delta connection. In some applications, SVCs are coupled to distribution lines through step-down transformers so that reactance compensation is performed under relatively low voltages (e.g., 480 V instead of 25 kV) that may reduce hardware costs. In some applications, SVCs are coupled to transmission lines through step-up transformers so that reactance compensation is performed under relatively medium voltages (e.g., 4.1 kV to 34.5 kV) that may reduce hardware costs and allow connection to much higher voltages (e.g. 69 kV to 256 kV).

Many types of electrically controlled switches can be used in SVCs. For example, each of the main valve and/or the damping valve may include a diode/thyristor pair, or alternatively, a thyristor/thyristor pair, both of which in "ON" state allow full conduction of AC current. In the case of a thyristor-thyristor pair, each one of the thyristors is controllable by gate signals, and this type of switches can be turned on faster (e.g., at the end of either positive or negative cycles) than a diode/thyristor pair (which is generally turned on only at the end of negative cycles). In addition, various thyristors are suitable for use in combination with diodes, thyristors, or other non-thyristor solid-state devices (e.g., transistors) as components of an electrically controlled switch. For instance, thyristors capable of switching off by gate control (instead of current zero) can be coupled in use with a switch controller that is configured to provide such gate control signals. Examples of gate control thyristors include Gate Turn-Off thyristors (GTOs) and Integrated Gate-Commutated Thyristors (IGCTs).

In this application, although SVCs are described primarily in the context of using power compensation to regulate line voltage, there are many applications where SVCs are useful in providing power compensation. For example, SVCs may be coupled to power generation systems prior to grid connection points or to transmission line in a delivery network for improving power factor of the electricity being transmitted. In this case, instead of performing voltage correction, SVCs may be regulated to provide controlled amounts of capacitive reactance to bring operating PF to a target level (e.g., close to unity).

Many control techniques can be used to control the operation of switches in SVCs, including for example, integral-cycle switching techniques, phase-controlled switching techniques, or a combination of both. In some systems, voltage corrections (or PF corrections) may be achieved through operating multilayer control circuits that perform coarse and fine voltage adjustments respectively.

In some applications, SVCs may also include a bank of thyristor-controlled reactors/inductors to provide fine voltage control. A varying number of reactors may be switched into the circuit at a given time to provide a continuously variable MVAR injection (or absorption) to electric networks.

When desired, several transient characteristics (such as damping ratio and settling time) of SVCs can be conveniently tuned to desired ranges by changing the resistance value of the damping resistor. For example, depending on design objectives, a SVC can be configured to have either critically damped or under-damped step response when operating under low voltage conditions. In addition, a SVC can be detuned to a frequency band that encloses the most prominent harmonic components that need to be attenuated in the circuit.

When desired, different amounts of reactance compensation can be applied to each separate phase so as to rebalance a utility line voltage that is unbalanced.

It is to be understood that the foregoing description is intended to illustrate and not to limit the scope of the invention, which is defined by the scope of the appended claims. Other embodiments are within the scope of the following claims.

What is claimed is:

1. A system for providing reactive power compensation to a utility power network, the system comprising:
   a switch coupled to the utility power network;
   a capacitor, coupled with the switch, for providing a controlled amount of reactive current based on conditions of the utility power network;
   a switchable power dissipation device coupled in series to the capacitor and configured to provide a preselected amount of impedance to the reactive current for a predetermined duration when a line voltage on the utility power network drops below a threshold.

2. The system of claim 1, further comprising a controller coupled to the utility power network and configured to control the switch based on line conditions of the utility power network.

3. The system of claim 2, wherein the controller is further configured to detect the line voltage on the utility power network.

4. The system of claim 3, wherein the controller controls the switch to operate in a first mode when the line voltage is in a range between 95% and 105% of a desired nominal voltage.

5. The system of claim 3, where the controller controls the switch to operate in a second mode when the line voltage is below the threshold.

6. The system of claim 1, wherein the power dissipation device includes a resistive element coupled in parallel with a second switch.

7. The system of claim 6, wherein the second switch is open for the predetermined duration to allow current passage through the resistive element when the line voltage is below the threshold.

8. The system of claim 7, wherein at the end of the predetermined duration, the second switch is closed to bypass the resistive element.

9. The system of claim 1, wherein the switch includes a diode connected in reverse-parallel with a thyristor that is switchable by a gate signal.

10. The system of claim 1, wherein the switch includes a first and second thyrsitor connected in reverse-parallel, each thyristor switchable by a gate signal.

11. The system of claim 4, further comprising an inductive reactor coupled with the capacitor and configured for reducing resonances generated by operating the switch in the first mode.

12. A method for controlling a reactive power compensation device connected to a utility power network, the method comprising:
   detecting a low voltage condition on the utility power network;
   discharging a capacitive element in the reactive power compensation device, in response to the low voltage condition, to the utility power network for a first duration; and
   connecting a device to the utility power network to dampen resonances generated by the discharging of the capacitive element.

13. The method of claim 12, wherein the capacitive element is coupled in series with a switch.

14. The method of claim 13, further comprising closing the switch, in response to the low voltage condition, for the first duration to allow the capacitive element to provide reactive power to the utility power network.

15. The method of claim 12, wherein said connecting a device includes connecting a switchable power dissipation device for a predetermined second duration.

16. The method of claim 15, wherein the predetermined second duration is shorter than the first duration.

17. The method of claim 15, wherein the switchable power dissipation device includes a resistive element coupled in parallel with a second switch.

18. The method of claim 17, further comprising opening the second switch during the predetermined second duration so that the capacitive element discharges through the resistive element to the utility power network.

19. The method of claim 12 wherein said detecting the low voltage condition includes detecting a line voltage on the utility power network and comparing the line voltage with a predetermined low voltage threshold.

20. The method of claim 12, wherein said detecting the low voltage condition includes detecting a line current on the utility power network and comparing the line current with a predetermined current threshold.

21. A method for providing reactive power compensation to a utility power network, the method comprising:
providing a varying number of capacitors to supply a controlled amount of reactive current to the utility power network under a first line condition; and
connecting a power dissipation device for a predetermined duration to provide impedance to the reactive current of each of the number of capacitors under a second line condition.

22. The method of claim 21, wherein the first line condition occurs when line voltage is within a range between 95% and 105% of a desired nominal voltage.

23. The method of claim 21, wherein the second line condition occurs when line voltage falls below a preset low voltage threshold.

24. The method of claim 21, further comprising detecting an electric signal on the utility power network for determining the first and second line conditions.

25. The method of claim 21, further comprising:
coupling each of the capacitors with one of a plurality of switches; and
discharging a selected number of capacitors to the utility power network by controlling at least some of the plurality of switches.

26. The method of claim 21, wherein the power dissipation device includes a resistive element coupled with a switch.

27. The method of claim 26, wherein connecting the power dissipating device includes opening the switch for the predetermined duration to allow capacitors to supply reactive current to the utility power network through the resistive element.

* * * * *